(12) United States Patent
Grundhofer et al.

(10) Patent No.: US 9,956,717 B2
(45) Date of Patent: May 1, 2018

(54) MAPPING FOR THREE DIMENSIONAL SURFACES

(71) Applicant: Disney Enterprises, Inc., Burbank, CA (US)

(72) Inventors: Anselm Grundhofer, Greifensee (CH); Thomas F. LaDuke, Orange, CA (US); David Robert Wyatt Rose, Glendale, CA (US); Henning Zimmer, Zurich (CH); Dumene Comploi, Los Angeles, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 790 days.

(21) Appl. No.: 14/317,244

(22) Filed: Jun. 27, 2014

(65) Prior Publication Data

US 2015/0375445 A1    Dec. 31, 2015

(51) Int. Cl.
*B29C 51/46* (2006.01)
*B29C 51/26* (2006.01)
*B29C 51/08* (2006.01)
*B29C 51/10* (2006.01)

(52) U.S. Cl.
CPC ........... *B29C 51/46* (2013.01); *B29C 51/264* (2013.01); *B29C 51/08* (2013.01); *B29C 51/10* (2013.01); *B29C 2791/006* (2013.01); *B29C 2795/002* (2013.01)

(58) Field of Classification Search
CPC . B29C 51/46; B29C 51/264; B29C 2795/002; B29C 51/08; B29C 2791/006; B29C 51/10

USPC .......................................................... 700/98
See application file for complete search history.

(56) References Cited

U.S. PATENT DOCUMENTS

| 4,978,216 A | 12/1990 | Liljegren et al. |
| 5,040,005 A * | 8/1991 | Davidson ................ B29C 51/00 355/47 |
| 5,221,937 A | 6/1993 | Machtig |
| 7,427,317 B2 | 9/2008 | Sloan |
| 8,049,960 B1 | 11/2011 | Ligon |
| 8,224,064 B1 * | 7/2012 | Hassebrook ....... G01B 11/2513 345/585 |

(Continued)

OTHER PUBLICATIONS

U.S. Appl. No. 14/317,678, filed Jun. 27, 2014.

*Primary Examiner* — Kenneth M Lo
*Assistant Examiner* — Alan Chu
(74) *Attorney, Agent, or Firm* — Dorsey & Whitney LLP

(57) ABSTRACT

The present disclosure includes a method for modifying an input image to map to a three dimensional shape prior to forming the three dimensional shape. The method includes receiving by a processor at least two pre-forming images of a locally unique non-repeating pattern printed on an input material. The at least two pre-forming images are captured prior to the input material being formed into the three dimensional shape. The method further includes receiving by the processor at least two post-forming images of the pattern printed on the input material, wherein the post-forming images are captured after the input material has been formed into the three dimensional shape and analyzing by the processor the at least pre-forming images and the at least two post-forming images to determine a translation table.

27 Claims, 10 Drawing Sheets
(4 of 10 Drawing Sheet(s) Filed in Color)

(56) References Cited

U.S. PATENT DOCUMENTS

| | | |
|---|---|---|
| 8,256,904 B2 | 9/2012 | Reichow et al. |
| 2005/0243101 A1* | 11/2005 | Sasaki .................... G06T 15/04 345/601 |
| 2009/0180712 A1* | 7/2009 | Pollack ................... B29C 51/00 382/285 |
| 2010/0125356 A1* | 5/2010 | Shkolnik ............ B29C 67/0088 700/98 |
| 2012/0326356 A1 | 12/2012 | Martin |
| 2014/0218477 A1* | 8/2014 | Pawelski ............ H04N 13/0253 348/46 |
| 2014/0267254 A1* | 9/2014 | Sievert ................. G06T 7/0046 345/420 |
| 2015/0325044 A1* | 11/2015 | Lebovitz ................ G06T 15/04 345/420 |
| 2016/0161836 A1 | 6/2016 | Wang et al. |

\* cited by examiner

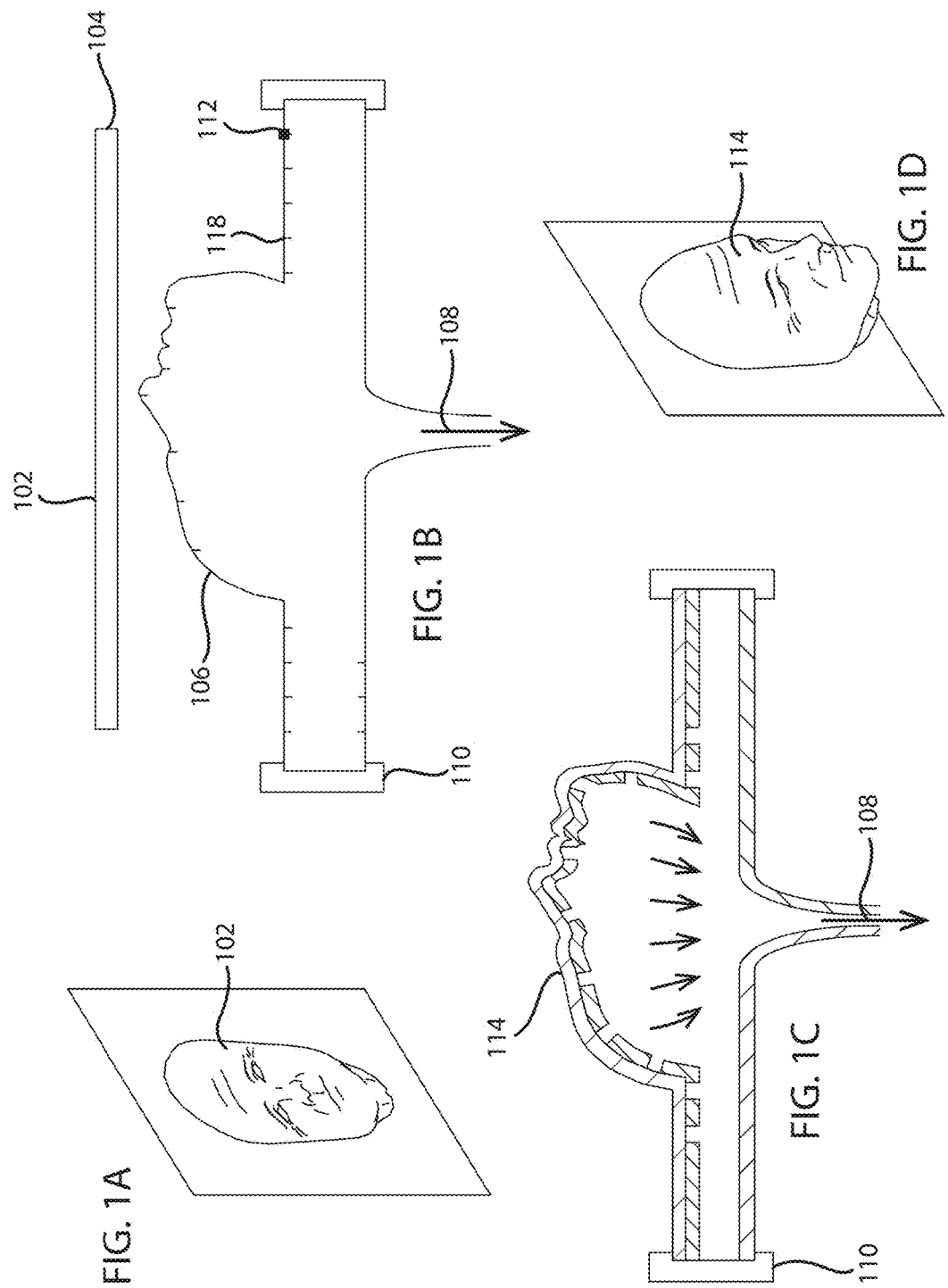

MAPPING FOR THREE DIMENSIONAL SURFACES

FIELD

The present disclosure relates generally to vacuum-formed or thermoformed three-dimensional surfaces created from a thermoforming material with a two-dimensional printed image. More specifically, embodiments relate to systems and methods for producing accurate texture mapping or texture coordinates of the three-dimensional surfaces.

BACKGROUND

Thermoforming is a manufacturing process where a plastic sheet is heated to an elevated temperature and is formed to a specific shape defined by a mold, and then is generally trimmed to create a product. The plastic sheet is heated to a high-enough temperature such that the sheet can be stretched into or onto a mold and then cooled to form a shaped product.

In some applications, an image, such as a two-dimensional (2D) printed image, is printed on a thermoforming material, such as a plastic sheet, which may then be thermoformed or vacuum-formed to produce a three-dimensional (3D) surface. The 2D image may be printed on the thermoforming material, such as the plastic sheet, by using vacuum formable inks. However, during the thermoforming process the 2D printed image may be distorted depending upon the complexity of the 3D shape (e.g., the geometry or surface curvature). Common methods for creating 3D surfaces using thermoforming processes or vacuum forming process may require a trial and error process to make adjustments to the 2D image to account for changes during the 3D forming process.

Various engineering software programs have been developed to estimate the vacuum forming distortion effects on vacuum formable inks. Estimations or predictions of the deformed positions based upon theoretical modeling may depend upon the deformed materials and their properties, and may also depend upon the various ways in which the 3D surface may deform locally. In absence of an accurate physical model of the material properties and the deformation effects, it is typically extremely difficult to accurately estimate or predict the texture coordinates needed to account for the deformation process.

There have been techniques developed for forming reproducible 3D vacuum-formed surfaces or objects. For example, U.S. Patent Publication 2009/0180712 to Mark Pollack et al. discloses a grid technique, which uses printed grid lines of colored quads to measure and compensate distortions at specific grid intersections or grid points. However, the grid technique does not produce accurate 2D prints or images input material for complicated geometries or shapes, such as those including fine details. Also, when analyzed automatically, such as by a computer, the grid technique typically will not produce accurate print images for concave shaped geometries because after forming the grid lines will not be continuous over a 3D geometry with a concave region. In particular, the grid lines may "disappear" as viewed by the computer near the concave region, reducing the ability to use those lines to determine the distortion effect after forming. In other words, the grid line technique produces occlusions so that certain features will not be detectable using an automated process. Further, increasing the density of the grid does not correlate with a higher sensitivity for the technique as the probability of errors may increase as the number of grid lines effected by concave regions may become higher.

It is with these shortcomings in mind that the present disclosure has been developed.

SUMMARY

The present disclosure includes a method for modifying an input image to map to a three dimensional shape prior to forming the three dimensional shape. The method includes receiving by a processor data corresponding to a local unique non-repeating pattern printed an input material, where the data represents the pattern on the input material prior the input material being formed into a three dimensional shape. The method further includes receiving by the processor at least two post forming images of the pattern printed on the input material, where the post forming images are captured after the input material has been formed into the three dimensional shape, and finally analyzing by the processor the locally unique pattern data and the at least two post-forming images to determine a translation table or a translation map.

Other embodiments of the present disclosure include a method for modifying a two-dimensional texture for a vacuum-formed three dimensional surface. The method includes receiving by a processor an image of a mapping pattern printed on an input material from at least two positions, the mapping pattern including a locally unique non-repeating pattern; receiving by the processor a 2D image of a 3D surface of the input material from the at least two positions, where the 3D surface is created by deforming the input material; determining by the processor a coordinate look up table or a displacement map of the 3D surface corresponding to each pixel in the digital image of the mapping pattern from each of the at least two fixed positions; reconstructing by the processor a 3D shape with color from a 2D print from a 2D texture coordinate look up table or displacement map; and forming by the processor a modified 2D print from the reconstructed 3D shape.

Yet other embodiments include a system for modifying an input image to print on a material before the material is formed to a three dimensional shape. The system including a light source configured to light a surface of the material, one or more cameras configured to capture an image from at least two positions relative to the material, a computer in communication with the camera, where the computer includes a processor that is configured to determine a 2D texture coordinate look up table or a displacement map of a vacuum-formed 3D surface.

Additional embodiments and features are set forth in part in the description that follows, and will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1A is an image of a 2D print.

FIG. 1B illustrates a 3D mold surface and a thermoforming sheet prior to vacuum forming in accordance with embodiments of the present disclosure.

FIG. 1C illustrates a vacuum-formed thermoforming sheet to form a 3D surface in accordance with embodiments of the present disclosure.

FIG. 1D is a perspective view of the 3D surface of FIG. 1C.

SPECIFICATION

Overview

Figure 1E:
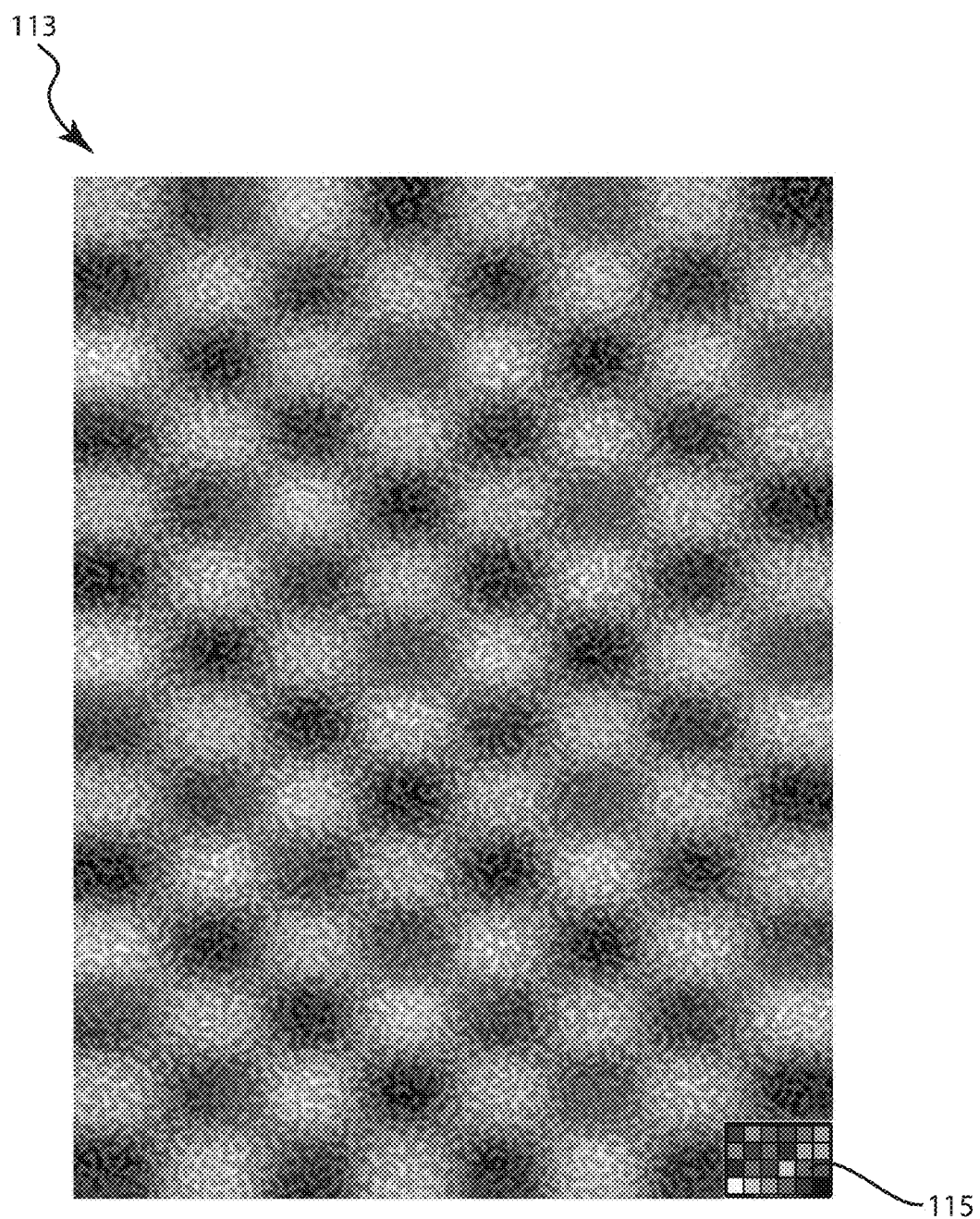
FIG. 1E is a 2D image of an example mapping pattern that may be used to create the 2D surface of FIGS. 1C and 1D.

The present disclosure relates to producing an accurate 3D representation of a 2D textured print. Specifically, embodiments relate to an automated solution to accurately generate one or more texture coordinate look-up tables for a vacuum-formed three-dimensional (3D) surface of a 3D object. With the texture coordinate information, a 2D textured print (e.g., aesthetic image printed onto a surface) may be distorted on a planar thermoforming material such that the 3D vacuum-formed surface displays the desired color of the textured print at the desired position. In other words, using the look-up table the 2D print is modified so that when the modified print is printed on the thermoformed material before forming, the pixels of the image are in the desired locations on the 3D shape after forming. The modified 2D textured print may be stored in a computer for further applications.

The present method uses a locally unique non-repeating pattern printed on an input material to provide accurate estimation of the occurring deformation effects for the vacuum-formed objects. The locally unique pattern is used to generate the look-up table. First, the pattern is printed on the input material, and then images of the printed input material are captured before the printed input material is formed into the 3D shape and after the input material has been formed. In some embodiments, however, only images of the pattern after forming may be required and a digital file or other data corresponding to the pattern may be used to correspond to the pre-formed images. In other words, because the pre-formed images may capture the image printed on the 2D surface, the digital data file of the mapping pattern (in 2D) may be used rather than actual images of the pattern printed on the input material.

Images of the pattern from the pre and post formed input material are analyzed to generate a texture map storing the desired texture coordinates in a look-up table, these coordinates can be used to translate an input 2D print or image into a modified output print or image that can be printed on the pre-formed surface to create a desired output 3D surface. Alternatively, the digital input image of the locally unique pattern can be used directly instead of the pre formed captured images. In this example, the color and brightness transformation between cameras and the digital input should be known. The color and brightness transformation information can be achieved by calibrating the camera by capturing an additional printed calibration pattern such as an xrite calibration chart. The locally unique pattern may contain random color and intensities and other various kinds of pixel characteristics that can be used to form non-repeating patterns, such as random noise, random color noise, and/or binary patterns. The pixel characteristics that are varied to create the local unique pattern may be used individually to create the pattern (e.g., varying color) or may be combined (e.g., varying color and intensity).

As one example, the present method uses a camera to capture images of the input material with the printed locally unique pattern or a mapping pattern that is locally unique at various positions and then captures two or more images of the vacuum-formed 3D object with the mapping pattern from the same locations or positions. By capturing images from various positions, a 3D shape or geometry may be reconstructed using the captured images. As will be discussed in more detail below, the captured images of the input material with the locally unique pattern provide high resolution that accurately track the changes that occur to the input material after forming. The high resolution allows the method to better than conventional methods to modify a desired image to correspond to the final 3D shape, especially in instances where the 3D shape includes complex contours and/or high frequency details.

The images of the input material with the pattern are analyzed to determine how a particular pixel in the pattern on the input material (i.e. pre-formed) has changed in location and/or size after the input material has been formed into a 3D surface. In particular, using the locally unique, non-repeating pattern for each pixel, correspondence estimators can be used to identify the pixel of the image from the input material corresponding to each respective pixel in the captured images of the vacuum-formed 3D surface. The correspondence estimators may include dense optical flow, scale invariant feature detectors, and the like. In some examples the correspondence estimation operation may be performed automatically by a computing device, which reduces the error and time required to determine the pixel changes. Because the locally unique pattern is non-repeating, each pixel of the captured image of the input material contains a specific pattern that can be recognized and matched to the vacuum-formed 3D surface. For example, for each pixel in the captured images of the vacuum-formed 3D surface the corresponding pixel or coordinates on the planar input material or printed texture or textured print may be identified by the correspondence estimators.

By using the texture coordinate look-up table that includes texture coordinates of a vacuum-formed 3D surface, a planar textured print can be modified to generate a modified 2D texture, which may be printed on an input material, planar surface, such as a thermoforming material (e.g., a plastic sheet), such that the vacuum-formed 3D surface (after forming) accurately displays the desired color of the print at the desired position.

One application of the texture coordinates or texture mapping of the vacuum-formed 3D surface is to produce duplicate copies of vacuum-formed 3D surfaces or thermoformed surfaces with deformed 2D printed images that are generated by using texture mapping or texture coordinates or displacement map and the original un-deformed 2D input image. The vacuum-formed 3D surfaces may have very fine details due to the high accuracy of the present method.

Another application involves adding the texture of the vacuumed formed 3D surface to an original 3D model used to form a mold surface in vacuum forming. To do so, the texture may be matched to a reconstructed 3D geometry. With a slight adjustment, the texture on the original 3D model may be matched to the position on the planar or 2D print (pre-modified image). Texture may include any type of texture that is meant to cover all or a portion of a surface to provide a modified aesthetic appearance for a surface.

A further application of the present disclosure may involve combining a video projection image with an image of a vacuum-formed material, such as plastic sheet. Specifically, the present disclosure provides a method for combining 3D images produced with video projector with the 3D image of a vacuum-formed 3D surface. The video projector may include rear-projected heads, scenic elements, or the like. A vacuum-formed 3D texture or image may be matched to or aligned with the projection mapped texture or image. The projection mapped texture and the vacuum-formed 3D texture all come from the same original 3D model.

As one particular example, the 3D surfaces produced using the methods herein may be used to create animatronic characters, statues, and other 3D shapes. In conventional applications for animatronic characters, such as theme parks, an artist paints the 3D formed surface for each character (such as the character's face) so that the colors are located in a desired position. This requires a lot of time, a skilled artist, and often copies of the same character may have slightly different characteristics due to the fact that characters would be painted individually by different people or by the same person at different times. The artistic approach has been used conventionally used as printing after a 3D material has been formed into a character is not typically possible with most printers. Additionally, without a technique to accurately modify the 2D image based on the 3D topography after formation, printing the image on the material before forming resulted in inaccurate reproductions and thus undesirable results. To the contrary, using the techniques of the present disclosure the 3D surfaces can be printed and formed with a modified or desired image and may be highly repeatable at a fast rate. This allows characters at a variety of locations to have a uniform appearance, be printed without the requirement of a skilled artist, and be replaced quickly and accurately, i.e., if a component breaks and the character has to be replaced the character can be reprinted and formed and appear substantially the same as the original.

DETAILED DESCRIPTION

Initially, some definitions for terms used herein will be discussed. The term vacuum forming is a meant to describe a simplified version of thermoforming. As one example of vacuum forming, a planar plastic sheet is heated to a forming temperature, stretched onto a convex, or into a concave, mold surface, and forced against the mold surface by a vacuum (suction of air). The vacuum forming process can be used to make plastic parts having a variety of sizes and shapes. As will be appreciated, the techniques and methods described herein may be used with a vacuum forming processed, as well as other thermoforming or 3D molding process. As such although the discussion herein is made with respect to vacuum forming, it should be understood that the techniques may be used in many other forming processes.

The term input image is meant to describe an image, typically represented in 2D, that is to be printed onto the input material (e.g., thermoforming material) and then formed. The input image or texture is meant to encompass an image, print, pattern, coloring scheme, or the like printed on a material to vary the appearance of the material. The texture may include any or all of variations in hue, brightness, luminance, tactile characteristics, or the like. The image or texture may include coloring to illustrate features on the 3D surface, such as, but not limited to, a character's eyes, hair, nose, mouth, etc. The input image is used to create a realistic, artistic, or otherwise vary the outer appearance of the 3D formed object. The input image may typically be a 2D image that will be modified based on the mapping technique disclosed herein in order to correspond to changes in the input material so that, as one example, the eyes of the character will be in the desired location after the 3D surface has been formed.

The term modified image or distorted input image is meant to describe changes to the input image based on the translation or look up table. The modified image can be printed on the input material and after the input material has been formed and results in a desired output appearance for the 3D object.

The term input material is meant to describe an input material, typically 2D, such as a blank of material, that may have a height, length, and a width, but that may not have a varying topography, such as a formed shape or the like. That is, although the material may have a width or thickness (e.g., the thickness of the material itself), the top surface of the material may be substantially planar or with a flat topography. The input material is meant to encompass a material that is printed on and then formed such as through a vacuum forming process.

The term 3D object or surface is meant to encompass the input material or blank after it has been formed to vary the topography thereof. The 3D object will have geometry that is different from that of the input material and typically corresponds to the geometry of the mold used in the vacuum forming process.

The term pattern, mapping pattern, or mapping image, is meant to describe a locally unique and non-repeating pattern. The mapping pattern is used to determine changes between the input material pre-forming and post-forming for a given 3D shape or geometry and in particular changes that will need to occur to the input image based on the topographical changes in the input material. That is, the mapping pattern is used to generate a translation table for converting the input image to a modified or output image that when printed on the input material will create the desired output once the input material is formed. The pattern may include random noise (e.g., color, intensity, or brightness noise), pseudo random pattern, a binary pattern a storcastic distribution, a color ramp where every pixel within the pattern has a unique intensity but may have similar or the same colors, the pattern may also include an intensity gradient where the intensity is used to uniquely identify pixels on the surface. Additionally, it should be noted that the pattern may be used so that each pixel can be uniquely identified by a local neighborhood of pixels (e.g., surrounding pixels).

Turning to the figures, the vacuum forming system, the camera systems for capturing images, and the computer system for providing the 2D texture coordinate lookup table for translating a 2D image into a modified 2D image will be discussed in more detail. FIGS. 1A-1D illustrate a vacuum forming system to form a 3D object having a 3D surface from a planar thermoforming material, which is printed with a 2D texture prior to the vacuum forming.

FIG. 1A is an example image of a input material with a printed modified image 102. The printed image 102 may be colored or black/white image printed on an input material or thermoforming material, such as a plastic sheet or other blank of material. In some embodiments, the thermoforming material may be sufficiently thin such that it can be heated and vacuum-formed into a 3D surface. The printed image 102 in this example may be a modified image of an original 2D image that has been distorted or otherwise varied to account for changes in the input material (as will be discussed in more detail below). The translation of the input image to the modified image will be discussed below. Additionally, the input material may have characteristics that allow it to deform, flex, and otherwise modify when exposed to heat, but when cooled harden and retain the deformed shape.

FIG. 1B illustrates a 3D mold surface with the input material prior to vacuum forming in accordance with embodiments of the present disclosure. As shown in FIG. 1A the input material 104 is printed with a printed image 102. The input material 104 with the printed image 102 will be vacuum-formed into a 3D surface as shown in FIGS. 1C and 1D by a mold 106.

The mold 106 includes a 3D mold surface, for example, a contour of a human face or any 3D object. The shape and contours of the mold surface determine the final formed shape of the input material 104 and are selected based on the desired application for the formed surface. For example, in instances where the formed input material 104 will be used for an animatronic, the 3D mold surface may be shaped to include the features of a character's face, e.g., nose, mouth, etc. The mold 106 also includes a flat base portion surrounding the 3D mold surface. The mold 106 may be formed of cast aluminum, machined aluminum or composite. In some examples, the mold 106 may be 3D printed or computer numerical control (CNC) milled and then may be coated if desired. Composite molds may be a lower cost alternative to cast or machined aluminum molds.

When the input material 104 is positioned over the mold 106, the mold 106 may be vacuumed by a vacuum pump 108 to pull the input material 104 against the outer surface of the mold 106. Because the input material 104 may be heated or otherwise malleable, the vacuum causes the input material 104 to conform against the outer surface of the mold 106, matching the contours of the mold surface. Often, a frame 110 is used to hold the edge of the thermoforming material 104 to the mold 106 during the vacuum process to help prevent the material 104 from moving relative to the mold 106.

The vacuum forming mold 106 may include one or more registration marks 112, which help ensure that a plastic sheet with one input image input material is placed in the same position as a plastic sheet with the same input image (e.g. image of a desired 2D texture input material) in the vacuum forming machine. That is, the registration marks 112 may be used to assist in increasing the repeatability of the forming process so that a first material is positioned at the same location on the mold as a second material.

FIG. 1C illustrates the input material after being formed through the vacuum forming process. As shown, the input material 104 is molded into a 3D surface 114, which may be trimmed on the edges. FIG. 1D is a perspective view of the 3D surface 114. Depending on the forming process and material used, the formed 3D surface 114 may or may not need to be trimmed after forming. With reference to FIGS. 1A and 1D, the 3D surface 114 has the same color characteristics as the printed modified image 102, but the material has been formed into a varying shapes with contours, edges, and so on.

FIG. 1E is a 2D image of a mapping pattern 113 that may be used to create the 3D surface of FIGS. 1C and 1D. In particular the mapping pattern 113 may have a locally unique non-repeating pattern where each pixel within the pattern may be identified by a local neighborhood of surrounding pixels. The use of the mapping pattern 113 to create the 3D surface of FIGS. 1C and 1D will be discussed in more detail below. Additionally, with reference to FIG. 1E, the image includes a calibration chart 115 in a lower right hand corner. The calibration chart 115 may be used so that the image of the locally unique pattern can be used directly, rather than capturing images of the pre formed input material, as will be discussed in more detail below. The calibration chart 115 provides a transformation between the color and brightness of the cameras.

System for Creating a Translation Table

As will be discussed in more detail below, a translation method to modify the input image to a modified image that is printed on the input material may include one or more operations where images of the 2D and 3D surfaces with a mapping pattern printed thereon are captured. For example, one camera or multiple cameras with calibrated lens and sensors may be used to capture multiple images of the planar input material 104 from multiple locations or viewpoints. The pattern is printed on the input material. After vacuum forming a 3D surface or shape from the input material, images of the vacuum-formed 3D surface with the pattern may be captured again by the camera or cameras from at least two viewpoints. These viewpoints are the same as used for capturing the images of the planar input material 104. Capturing images at the same locations allows an estimation of the correspondences between the images of the pattern on the vacuum-formed 3D surface and the original 2D input material. As should be understood, often the camera or cameras that are used to capture the images of the planar input material may be the same as those used to capture the formed 3D surface, but not necessarily so.

In some embodiments, cameras may not be used to capture images of the input material and pattern. In these embodiments, the data of the mapping pattern in 2D may be used to replicate the images or the data that would be analyzed from the pre-formed images.

Figure 2A:
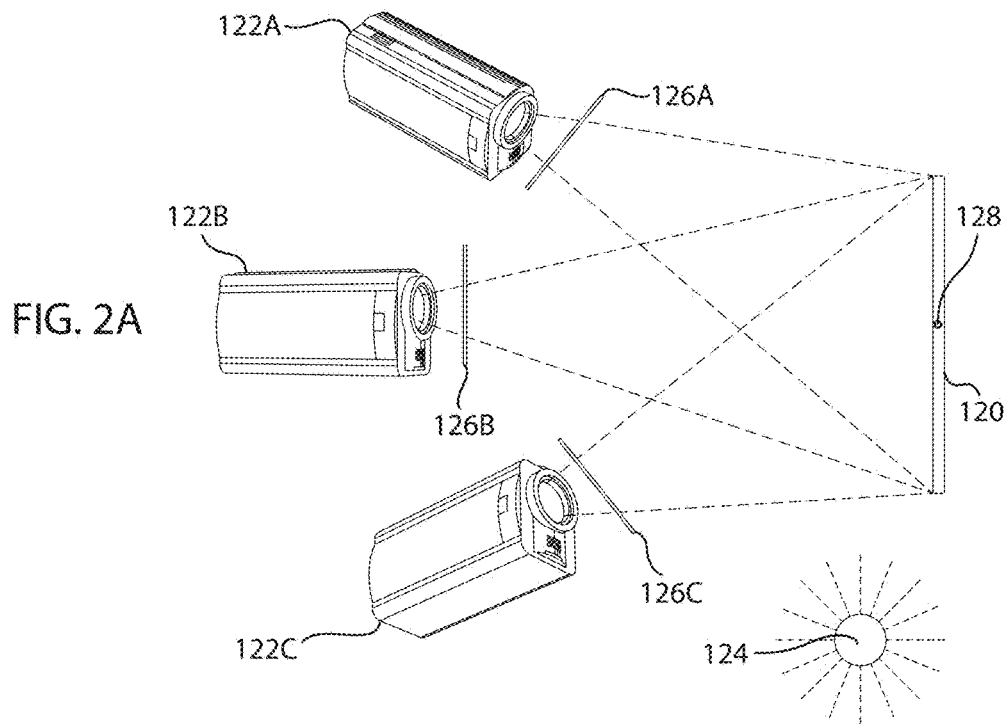
FIG. 2A is a top plan view of a simplified camera configuration configured to capture images of a 2D print in accordance with embodiments of the present disclosure.

FIG. 2A is a simplified camera configuration for capturing one or more images of a 2D input material having the mapping pattern printed thereon in accordance with embodiments of the present disclosure. As shown, several cameras 122A-C may be placed at different fixed positions with respect to a 2D input print with the mapping pattern 120 located at position 128, which is a reference point of the 2D input print. The cameras can capture images of the 2D input material with the printed mapping pattern from a plurality of viewpoints based on their various fixed positions. An additional light source 124 may be used when capturing the images to enhance the visibility of the captured images. When the 2D input material is shiny or reflective, polarization filters 126A, 126B, or 126C may be added in front of one or more of the cameras 122A-C to obtain better quality of the images without any visible specularities. In embodiments including polarization filters in front of the cameras, a light source filter may also be included, the light source filter being rotated 90 degrees relative to the light source.

It should be noted that depending on the geometry of the surface, a single flat lens camera may be used. In this example, one orthographic captured image may be used to compare the distortion from the input image on a pure 2D-plane without a 3D-reconstruction. In this case the images generally may have to be calibrated on an orthographic view and you would compare the image distortion on a single plane.

Alternatively, rather than capturing the images of the 2D input print, the images may be calibrated to an original digital image file of the 2D input print. The images may need to be calibrated because an image from the original digital file may look different from the images captured with a camera when the digital image file is loaded on a screen. For example, there may be a color contrast change or a color shift and the like. Therefore, the original digital image file needs to be calibrated to account for these changes.

To calibrate to the original digital image file, a color look-up table or a color map may be used to map the printed colors to the digital input. After the color mapping, the image from the digital image file may be changed so that the input image created from the digital image file matches to the color of the captured images. Alternatively, the captured image may be blurred, such as by defocusing the camera manually, to match to the input image from the digital image file.

Figure 2B:
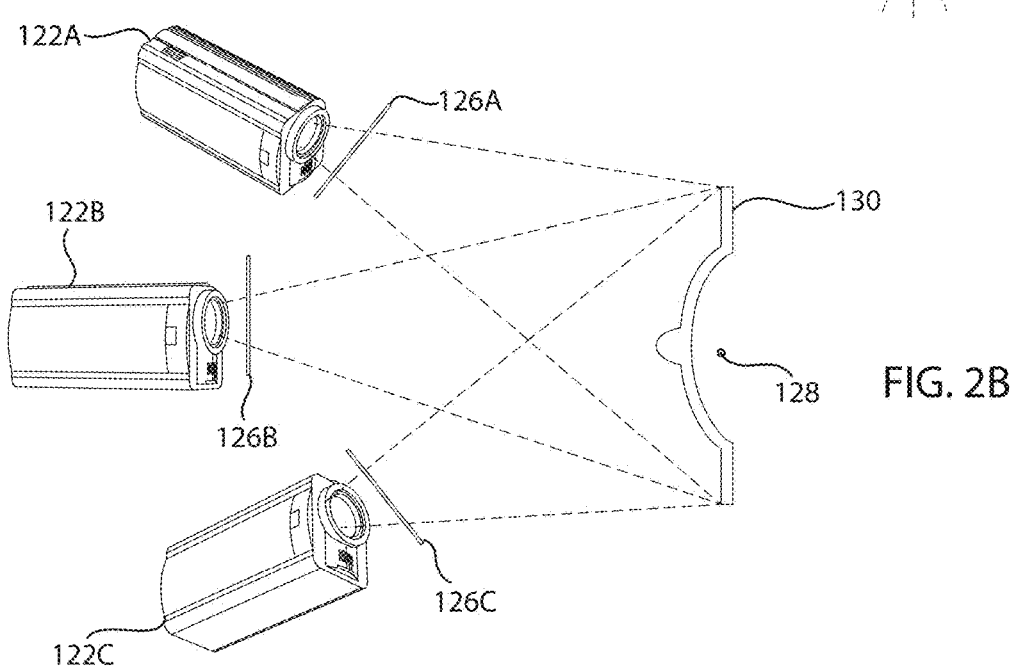
FIG. 2B is the simplified camera configuration of FIG. 2A configured to capture images a 3D object from the cameras at the same locations of FIG. 2A.

FIG. 2B is the simplified camera configuration of FIG. 2A for capturing images of a 3D surface of a 3D object with the printed mapping pattern from the cameras at the same locations of FIG. 2A. As shown, the cameras 122A-C remain in the same locations as shown in FIG. 2A, while the vacuum-formed 3D surface or the 3D object 130 (e.g. human face, character, animal) is placed in the same location or position 128 as the 2D texture. The cameras 122A-C can capture images of the vacuumed formed 3D surface.

The cameras may have the same resolutions or different resolutions. For example, one camera may have a higher resolution than another camera. In this example, the camera with a higher resolution, such as 200 mega pixels or higher, may capture images of the fine geometry at higher magnifications whereas the lower resolution camera may capture lower resolution details. However, higher resolution cameras may generate images without much distortion in depth, which can provide better, more accurate, images.

Alternatively, a single camera may be used in multiple locations to capture images at the plurality of viewpoints, rather than using multiple cameras. It will be appreciated by those skilled in the art that the number of cameras used and/or the number of viewpoint locations depends upon the complexity of the geometry and desired sensitivity of the final output. For example, the geometry or shape of the 3D object 130 may vary and for the same 3D geometry, the 2D texture may also vary and as the geometry becomes more complex it may be desirable to include images captured from more viewpoints.

Depending upon the complexity of the surface, the cameras may capture images at multiple positions such that details on each surface point may be visible in at least two of the captured images. In many embodiments it is important to capture at least two images from two viewpoints of the vacuum-formed 3D surface with the pattern to allow reconstruction of the 3D shape. The positions of the cameras, e.g. rotation and translation with respect to a world coordinate system, may be mechanically set or may be calibrated by using external information from camera pose estimation.

Figure 3:
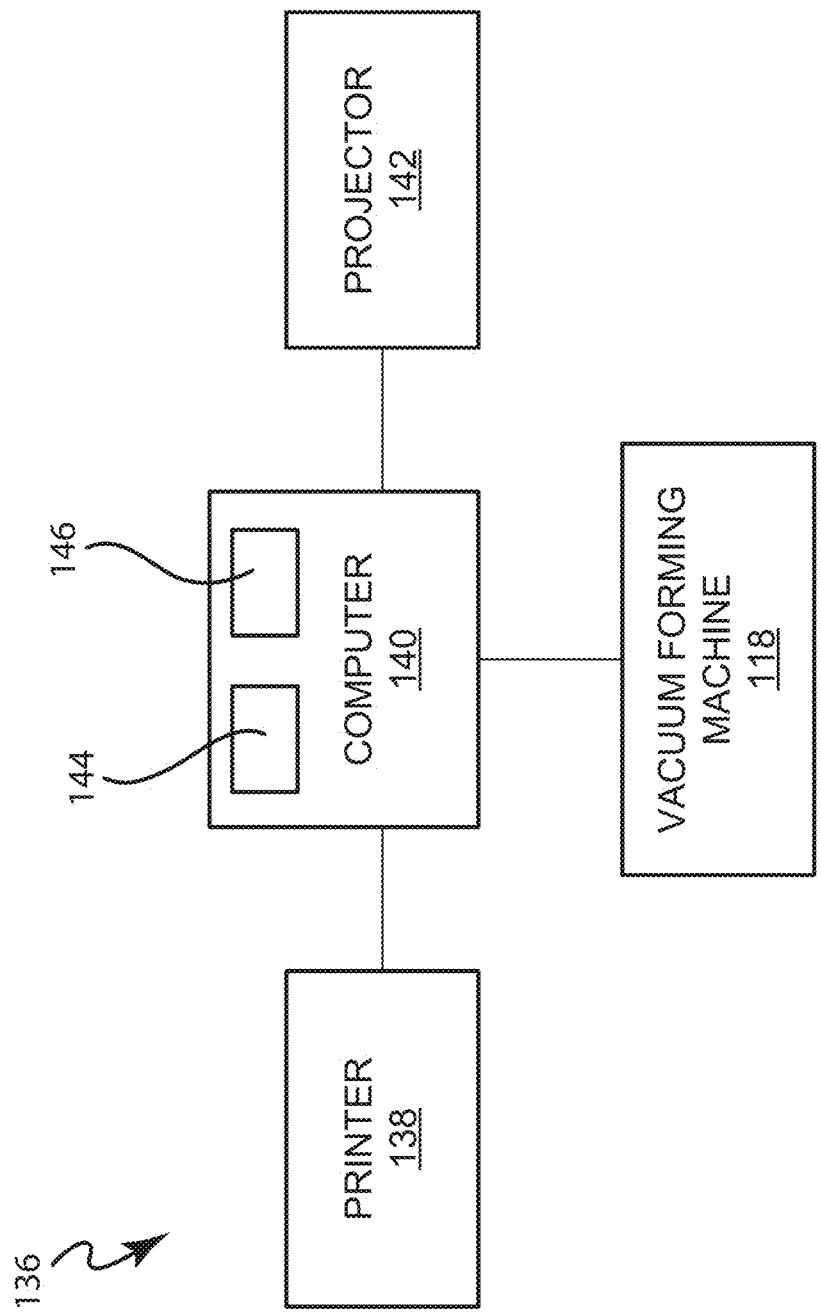
FIG. 3 is a simplified block diagram of a system configured to produce a vacuum-formed or deformed 2D print or texture from an un-deformed 2D print in accordance with embodiments of the present disclosure.

FIG. 3 is a simplified block diagram of a computer system configured to produce a modified 2D print from an input 2D print using the captured pattern image in accordance with embodiments of the present disclosure. As shown system 136 includes a computer 140 with at least a processor 144 and a memory 146 for data storage. The computer may be electronically coupled to the cameras 122 to receive the captured images from the cameras. The computer 140 may also be electronically coupled to a printer 138 to provide a digital image to print an image on a plastic sheet before the plastic sheet is placed in the vacuum-forming machine 118. The digital image may be an original input 2D texture, or planar print, which is printed on a plastic sheet before vacuum forming. The digital image may also be a desired 2D texture related to the original input 2D texture. The desired 2D texture is modified from the original input 2D texture and is printed on a planar thermoforming material prior to vacuum forming, such that the vacuum-formed 3D surface has the desired texture.

The computer 140 may also include one or more processing elements (e.g., microprocessor, microcomputer, etc.) that execute one or more programs or software. The computer 104 is used to estimate correspondence between the captured images of the vacuum-formed 3D surface, on which the original input 2D texture is printed, and the image(s) of the original 2D input texture or original 2D input surface.

The computer 140 may perform correspondence estimation by various methods, alone or in combination, e.g. estimating correspondence between 2D images of a vacuum-formed 3D surface and an original input 2D texture. For example, one may manually establish the pixel correspondence, for example, by looking for the closest feature and clicking one correspondence a time. However, the manual method may be time consuming and tedious.

Correspondences may be automatically identified by the computer 140 by searching for the closest feature in the images of the vacuum-formed 3D surface to match to the feature in the original 2D input surface. For example, the comparison may include matching the color or appearance in the images of the vacuum-formed 3D surface and the corresponding original 2D input material. These correspondences may be first fixed and then other correspondences may be enforced. Since the mapping pattern includes a non-repeating and locally unique characteristics, the features of the images can be compared more easily than in conventional methods.

Automatic methods in estimating correspondence may include using scale invariant feature detectors and optical flow. The scale invariant feature detectors may search for a feature in a specific region of an image, for example, a large area or a small area or in a particular angle. The search by scale invariant feature detectors may be switched to a dense optical flow algorithm after searching for a number of features. For example, scale invariant features can also be applied in a dense manner by defining a specific feature descriptor for each pixel of interest in the camera image and matching it with the most similar one of the digital reference image/captured 2D flat image. Alternatively or additionally dense optical flow methods can be used which hierarchically search for the best matching pixel in the other image by comparing local image intensities, colors and gradients. In some embodiments, a combination of scale invariant feature detection and optical flow may be used. For example, scale invariant feature detection may be more accurate, but may take longer to run than optical flow. Therefore, by using optical flow initially and refining the results with the scale invariant feature technique, the method may be faster, but still quite accurate.

Typically each image will include millions of pixels, but the color palette is more limited. Therefore, in some embodiments, the matching operation may impose one or more smoothness assumptions. For missing regions or pixels between the picked correspondences, interpolation between two neighboring correspondences may be performed. For an intermediate region, an optical flow algorithm may be applied to interpolate. Optical flow is the pattern of apparent motion of objects, surfaces, and edges in a visual scene caused by the relative motion between an observer (an eye or a camera) and the scene. By using the dense optical flow algorithm, a vector represented a view for an observer may be found to start in one image (e.g. deformed image) and point to a corresponding position in the other image (e.g. un-deformed image). The vector represents 2D displacement coordinates (e.g. along an X axis and a Y axis) between the pixel in the captured image of the vacuum-formed 3D surface and the corresponding pixel in the original input 2D image. In other embodiments, alternative examples of interpolation methods, such as cubic spline interpolation, can be applied to fill up missing regions.

In alternative embodiments, physical modeling may be used to provide correspondence estimation in combination with the above methods. For example, the physical modeling may provide initial or starting points for the optical flow.

Methods to Create the Translation Table

Figure 4:
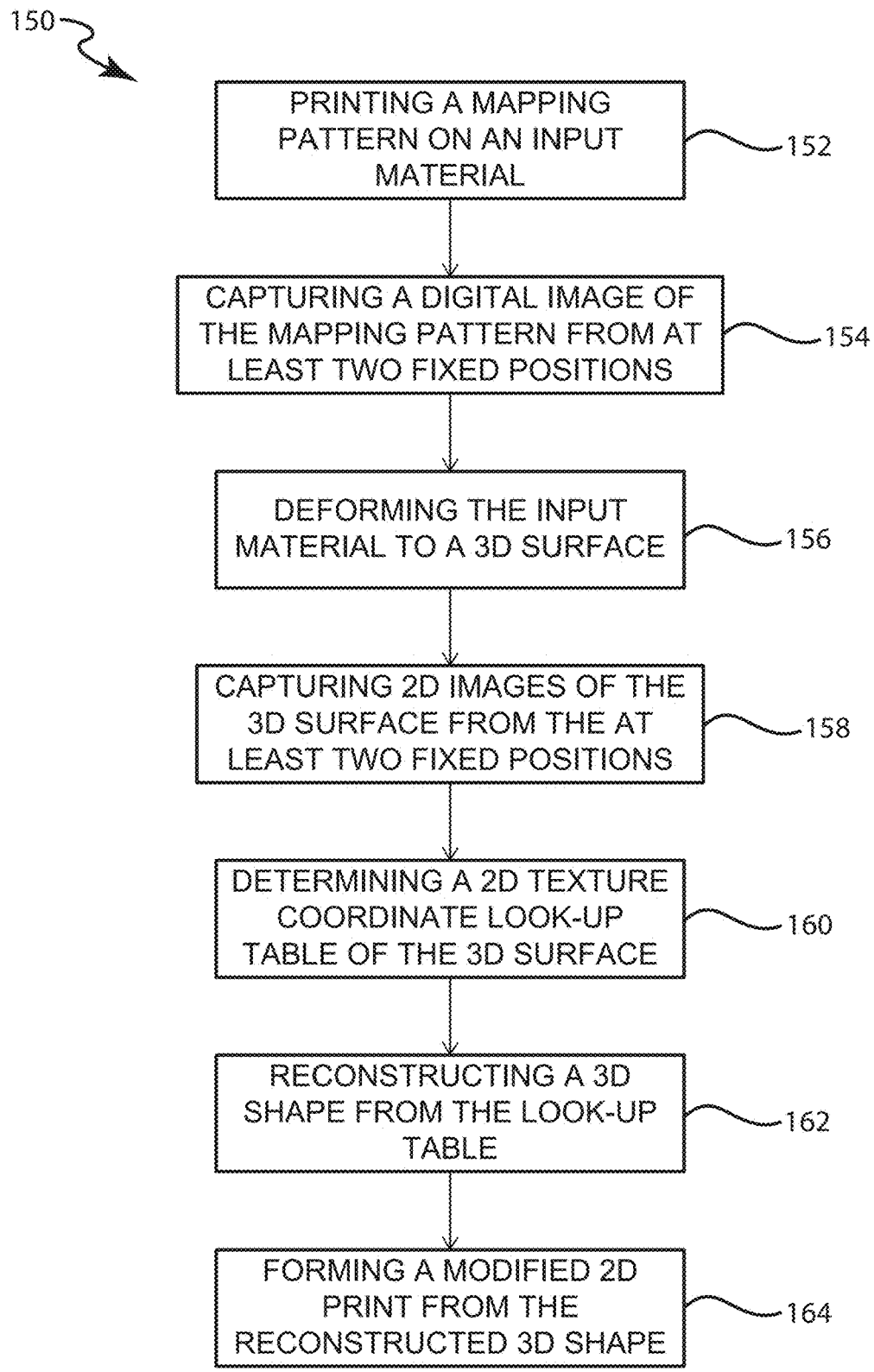
FIG. 4 is a flow chart illustrating a method for producing a distorted 2D texture for a vacuum-formed three-dimensional surface in accordance with embodiments of the present disclosure.

FIG. 4 is a flow chart illustrating a method for producing a desired 2D texture for vacuum-formed 3D surfaces in accordance with embodiments of the present disclosure. Method 150 may include printing a mapping pattern on the input material 104 at operation 152, for example, by using the printer 138 with a digital image provided from the computer 140, as shown in FIG. 3. Each pixel of the mapping pattern includes a locally unique non-repeating characteristic or pattern. The input material 104 may be a plastic sheet or other formable material. Some examples of plastic materials include, but are not limited to ABS, polystyrene, acrylic, polycarbonate, PVC, polyethylene, polypropylene, PETG, and a polymer blend.

Method 150 may include capturing a digital image of the 2D input material with the mapping pattern printed thereon from at least two fixed positions at operation 154, for example, by using the camera configuration at fixed locations as shown in FIG. 2A.

Method 150 may also include deforming the thermoforming material to form a 3D surface at operation 156, for example, by vacuum forming the 3D surface as illustrated and described with respect to FIGS. 1A-D. Method 150 may also include capturing a 2D image of the 3D surface with the mapping pattern from the at least two fixed position at operation 158, for example, by using the camera configuration from the same fixed positions, as shown in FIG. 2B.

Method 150 may also include determining a 2D texture coordinate look-up table of the 3D surface. The look-up table includes displacement coordinates corresponding to pixels of the mapping pattern on the 2D input material at operation 160. For example, the look up table may be used to translate a pixel into a XYZ coordinate and/or go from a XYZ coordinate directly to a pixels. For example, the mapping pattern may have S, T coordinates in a first mapping space and the input image to be modified may have XYZ coordinates. The lookup table is used so that for each XYZ coordinate the unique ST on the mapping pattern may be known. In other words, the pattern functions as a map to translate pixel locations. In these examples, for each coordinate on the XYZ system, there is a unique S, T location on the S, T software map or the U, V coordinate map, which allows the translation of pixels into locations on the surface.

As the resolution of the printing of the pattern on the input surface increases, the accuracy in translating pixels between the 2D and 3D surfaces may be increased.

One example of displacement coordinates or 2D texture coordinates for a given geometry are listed in Table 1 below. It should be noted that the below example is illustrative only. Additionally, it should be noted that the lookup table may be used to generate a mapping from each 3D geometry point to the corresponding 2D coordinate.

TABLE 1

2D Texture Coordinate Look-up Table

| Pixel | Locally unique Pattern | X-coordinate | Y-coordinate | Z-coordinate |
|---|---|---|---|---|
| $P_1$ | $LP_1$ | $X_1$ | $Y_1$ | $Z_1$ |
| $P_2$ | $LP_2$ | $X_2$ | $Y_2$ | $Z_2$ |
| $P_3$ | $LP_3$ | $X_3$ | $Y_3$ | $Z_3$ |
| $P_M$ | $LP_M$ | $X_M$ | $Y_M$ | $Z_M$ |

The first column includes a number of pixels, which are represented by $P_1$, $P_2$, $P_3$, ... $P_M$ for an original (e.g., pre-modified) texture or a planar texture. The second column includes the locally unique pattern, including $LP_1$, $LP_2$, $LP_3$, ... $LP_M$. The third and fourth and fifth columns include 3D coordinates for the deformed or distorted texture. Specifically, the third column includes the displacement coordinates along an X-axis, including $X_1$, $X_2$, $X_3$, ... $X_M$, corresponding to the pixels $P_1$, $P_2$, $P_3$, ... $P_M$ for the un-deformed texture. The fourth column includes the displacement coordinates along a Y-axis, including $Y_1$, $Y_2$, $Y_3$, ... $Y_M$. The fifth column includes the displacement coordinates along a Z-axis, including $Z_1$, $Z_2$, $Z_3$, ... $Z_M$. The modified or deformed print can be obtained from the look-up table.

For each pixel (e.g. $P_M$), the locally unique pattern (e.g. $LP_M$), such as random color, intensity, or the binary pattern among others, is different from another pixel (e.g. $P_{M-1}$). Because of the locally unique pattern, the pixel in the desired 2D texture mapping including 2D texture coordinates (e.g. deformed image) has only one corresponding pixel in the planar texture or un-deformed texture.

From the captured images of a vacuum-formed 3D surface with the pattern, a look-up table like Table 1 may be generated. Because at least two images are captured for the vacuum-formed 3D surface at different positions, the two images allow a processing element to reconstruct the 3D shape by triangulation, which is disclosed below in more detail.

Method 150 may also include reconstructing a 3D shape from a look-up table at operation 162. The look-up table may provide the corresponding coordinates for each pixel of an input image to reconstruct the formed 3D shape. The reconstruction is obtained by triangulation using the corresponding pixel positions of the calibrated cameras. Reconstructing the 3D shape or geometry may be done actively by projecting structured light patterns, and capturing the light patterns with a camera, and then reconstructing the 3D shape. Alternatively, the projector may be omitted and the reconstruction may be done by simulating structured light patterns. The reconstructed 3D geometry includes a color print or a texture that is created on the 3D geometry or 3D surface from the look-up table. The reconstructed 3D geometry or shape may be substantially the same as the 3D model, which is used to make the mold surface in the vacuum forming process.

Having reconstructed the 3D locations for each pixel with the desired color, the reconstructed 3D shape is projected onto its location of the 2D image plane. The resulting 2D position is the desired texture coordinate related to the corresponding pixel location of the original un-deformed input 2D texture or image or print.

Method 150 may further include forming deformed or modified 2D texture from the reconstructed 3D shape at operation 164. By projecting the reconstructed 3D shape onto the same 2D plane as the 2D input material, an image may be captured by a camera, and stored in the computer. The captured image is the desired 2D texture.

Figure 5:
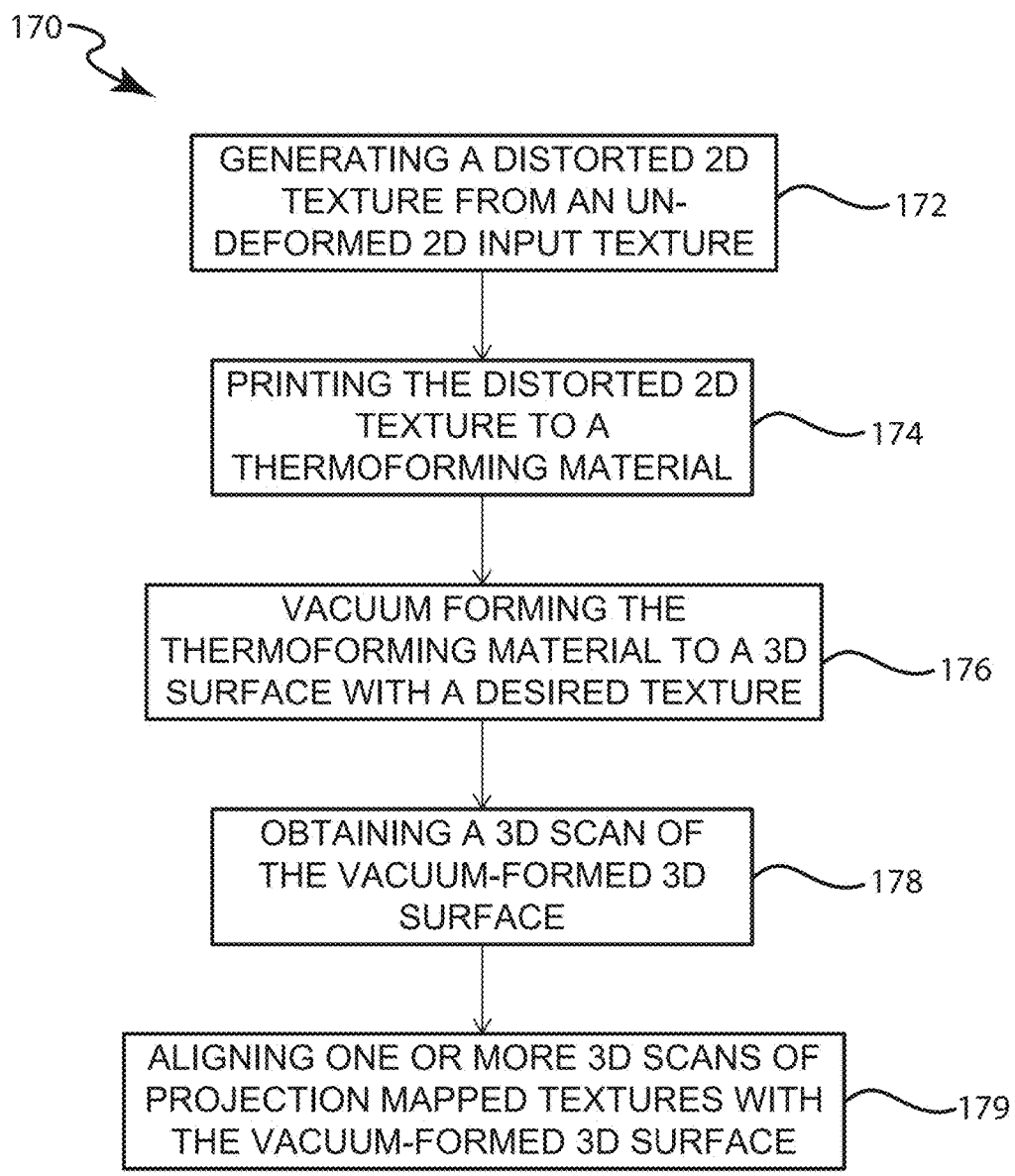
FIG. 5 is a flow chart illustrating a method for combining a 3D surface printed with a vacuum-formed image or texture with an image created from a projector in accordance with embodiments of the present disclosure.

FIG. 5 is a flow chart illustrating a method for producing a 3D surface with a desired 2D texture or image in accordance with embodiments of the present disclosure. Method 170 may include generating a modified 2D texture from an original 2D input texture by using to at least two 2D texture coordinate look-up tables for a vacuum formed 3D surface at operation 172. Method 170 may include printing the distorted 2D texture to a thermoforming material at operation 174. Method 170 may also include vacuum forming the thermoforming material to a 3D surface with a desired texture at operation 176.

The present method allows multiple 3D surfaces to be produced with consistency as compared to manually drawing or manually printing for each individual 3D object. Additionally, the present method is less labor intensive than conventional methods and thus results in lower production costs as compared to the conventional methods.

Method 170 may optionally include obtaining a 3D scan of the vacuum-formed 3D surface at operation 178, and aligning one or more 3D scans or images of projection mapped textures with one or more 3D scans or images of vacuum-formed surfaces at operation 179. The projection mapped textures use the same 3D model as used for generating the desired 2D texture printed on the vacuum-formed materials. The desired 2D texture is distorted from an original 2D input image or texture. An original 3D model is used in making the mold for the vacuum process. The projection uses the same original 3D model as the vacuum-formed materials.

Figure 6C:
FIG. 6C is a perspective view of a 3D surface printed with the modified 2D print of FIG. 6B.

Examples of the methods of FIGS. 4 and 5 will now be discussed. FIG. 6A is a photograph of an original 2D image or print in an embodiment. As shown, a flat character image 180 includes a black color nose 184, and an eye region 188 that is a mixture of a white color and a black color. The flat character image 180 also includes a black color eye brow 196 and a skin color face 192.

Figure 6B:
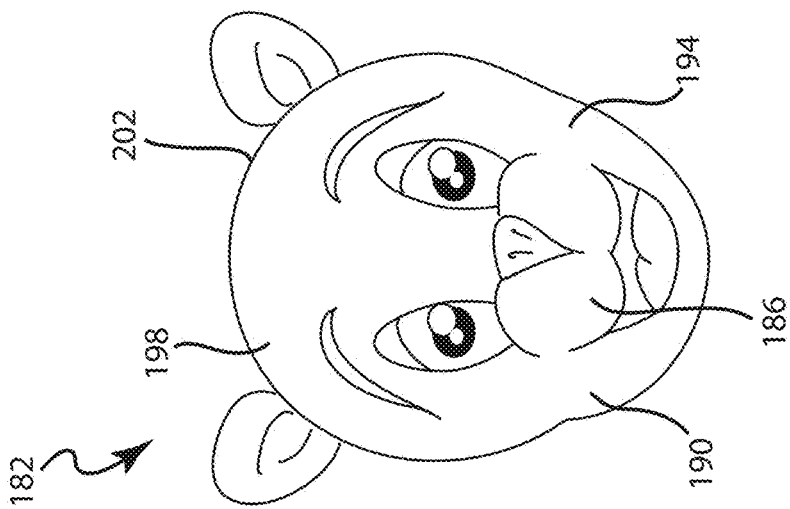
FIG. 6B is a photograph of a deformed 2D print or image related to the original flat pre-formed input print of FIG. 6A.
Figure 6A:
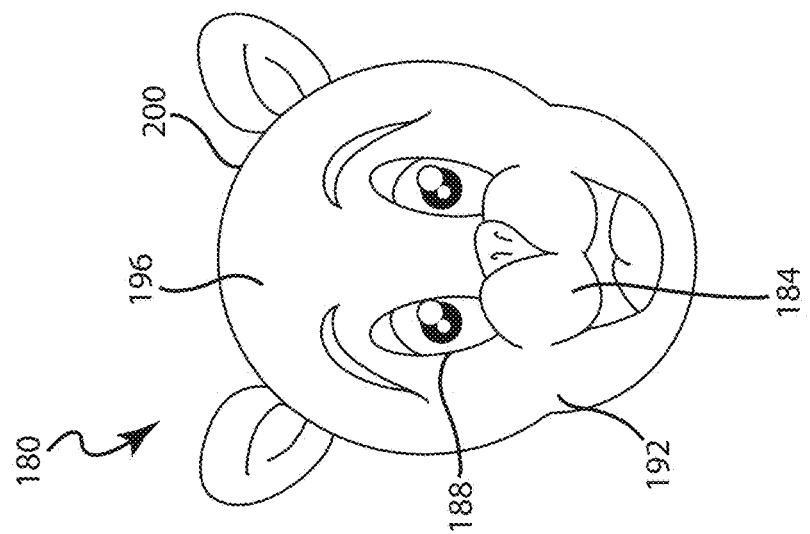
FIG. 6A is an image of an original input print or image prior to being formed in a first embodiment.

FIG. 6B is a photograph of a deformed 2D image or print related to the original print of FIG. 6A. FIG. 6B shows the image captured of the vacuumed formed 3D surface shown in FIG. 6C. The deformed 2D image is a vacuum-formed image 182, and includes the distorted 2D texture obtained from the flat image 180 and the 2D texture coordinate look-up table (e.g. Table 1), such as shown in the flow chart 150 in FIG. 4.

As shown in FIG. 6B, the vacuum-formed image 182 is modified (e.g., distorted or deformed) from the flat image 180 as shown in FIG. 6A. For example, the distorted nose 186 is larger than the original nose 184 as shown in FIG. 6A. The deformed face 194 is stretched longer than the original face 192 as shown in FIG. 6A. The deformed eye region 190 is larger than the original eye region 188 as shown in FIG. 6A. The deformed eye brow 198 is closer to the edge 202 of the face 194 than the un-deformed eye brow 196 to the edge 200 of the original face 192 as shown in FIG. 6A.

FIG. 6C is a perspective view of a vacuum formed 3D surface with a modified 2D print which is substantially identical to the deformed print of FIG. 6B. The modified print is created from the flat image and the look-up table. A 3D character face 204 is shown in FIG. 6C. This 3D face 204 is vacuum-formed from a plastic sheet printed with the vacuumed formed character image 182 as shown in FIG. 6B.

To obtain desired color of a 3D shape, the vacuum formed 2D image 182 is printed on an input material rather than the flat image 180, such as a plastic sheet, such that the 3D shape would have the desired color pattern.

A reconstructed 3D surface can be generated by using the look-up table. The reconstructed 3D face 204 is a very accurate presentation of the 3D model, which is used for mold in the vacuum forming, such as that shown in FIG. 6C. In this example, sample dimensions for the 3D face 204 are width 400 mm, height 180 mm and depth 180 mm, but can vary depending on the capabilities of the vacuum forming machine.

With the accuracy provided by the present method, a small 3D surface with fine details may be obtained. For example, the 3D surface may be within the range of a mm or less, depending on the used hardware. However, it should be noted that one of the features of the technique of the present disclosure is that it can be used with very small 3D features, as well as very large 3D features (e.g., ranging from millimeters, to meters). This allows the technique of the present disclosure to be very versatile and apply in many different applications, whereas conventional techniques may have to be specialized based on the dimensions of the desired 3D shape.

Figure 7B:
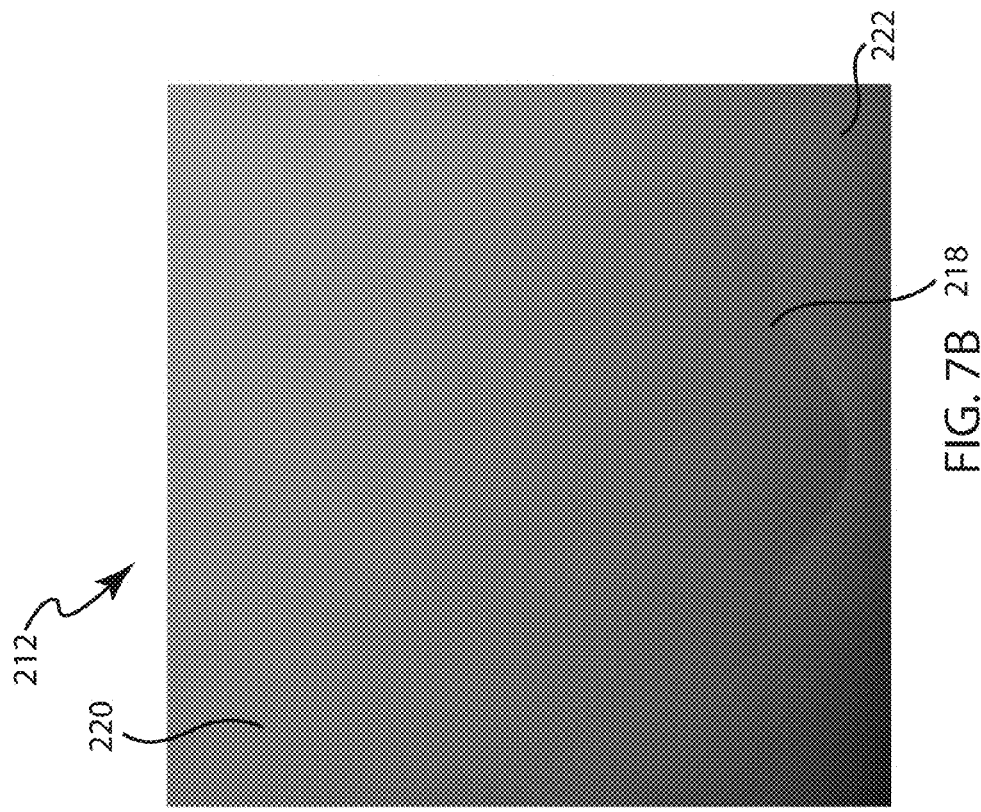
FIG. 7B is a photograph of a modified 2D print related to the original 2D pre-formed input print of FIG. 7A.
Figure 7A:
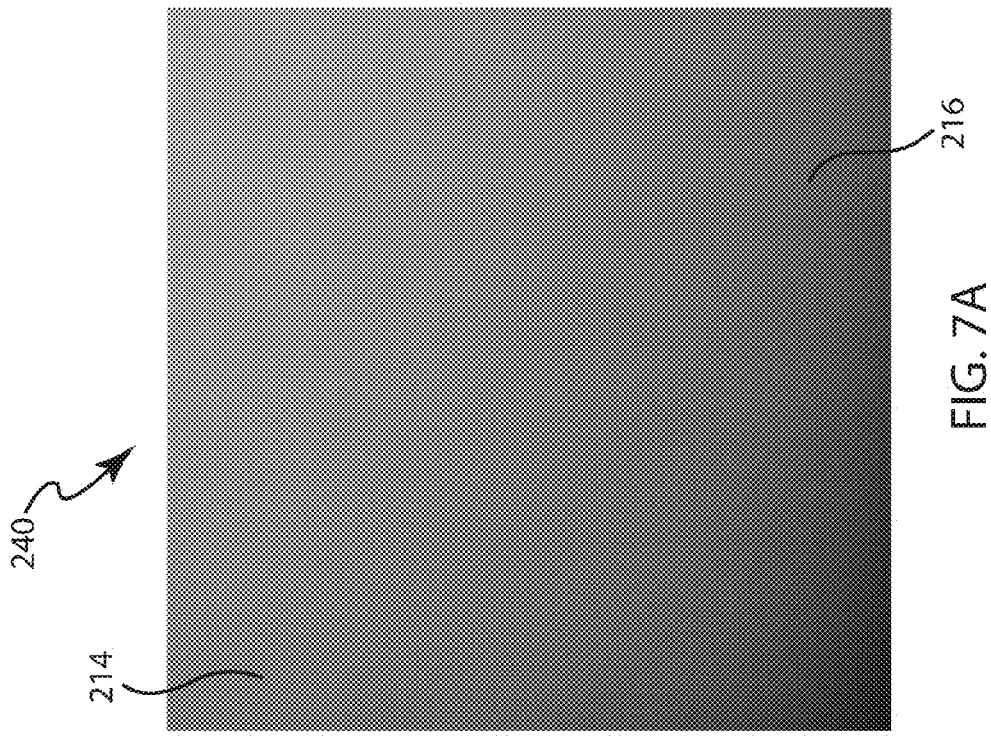
FIG. 7A is a photograph of an original 2D pre-formed input print in a second embodiment.

FIG. 7A is a photograph of the displacement maps of the input material prior to being formed. In this example, a displacement map 210 is a square frame print including a greenish color region 214 toward the left upper corner and an orange color region 216 toward the bottom right corner region. The color changes smoothly or continuously across the entire image such that each pixel of the image has a different color, which is a locally unique pattern. The color coding in the optical flow map 210 allow pixels to be identified in other views of the map.

FIG. 7B is a photograph of the pattern of FIG. 7A after forming. FIG. 7B shows the image captured of the vacuumed formed 3D surface shown in FIG. 7C. A vacuum-formed pattern 212 is the 2D image related to the un-deformed flat pattern image 210. The vacuum-formed displacement map 212 includes a square frame including a greenish region 220 toward the upper left corner, and an orange color region 222 toward the bottom right corner. The vacuum-formed displacement image map 212 also includes a facial contour 218, which is mostly in the orange color region 222 and partially in the greenish region 220. The orange color region 222 in the vacuum-formed pattern image 212 has a slightly lighter color than the orange color region 216 in the un-deformed pattern image 210. Also, the facial contour 218 in the vacuum-formed pattern image 212 as shown in FIG. 7B is not present in the un-deformed pattern image 210 as shown in FIG. 7A. Further, the greenish region 220 in the pattern image 212 has a slightly lighter color than the greenish region 214 in the un-deformed pattern image 210.

Figure 7C:
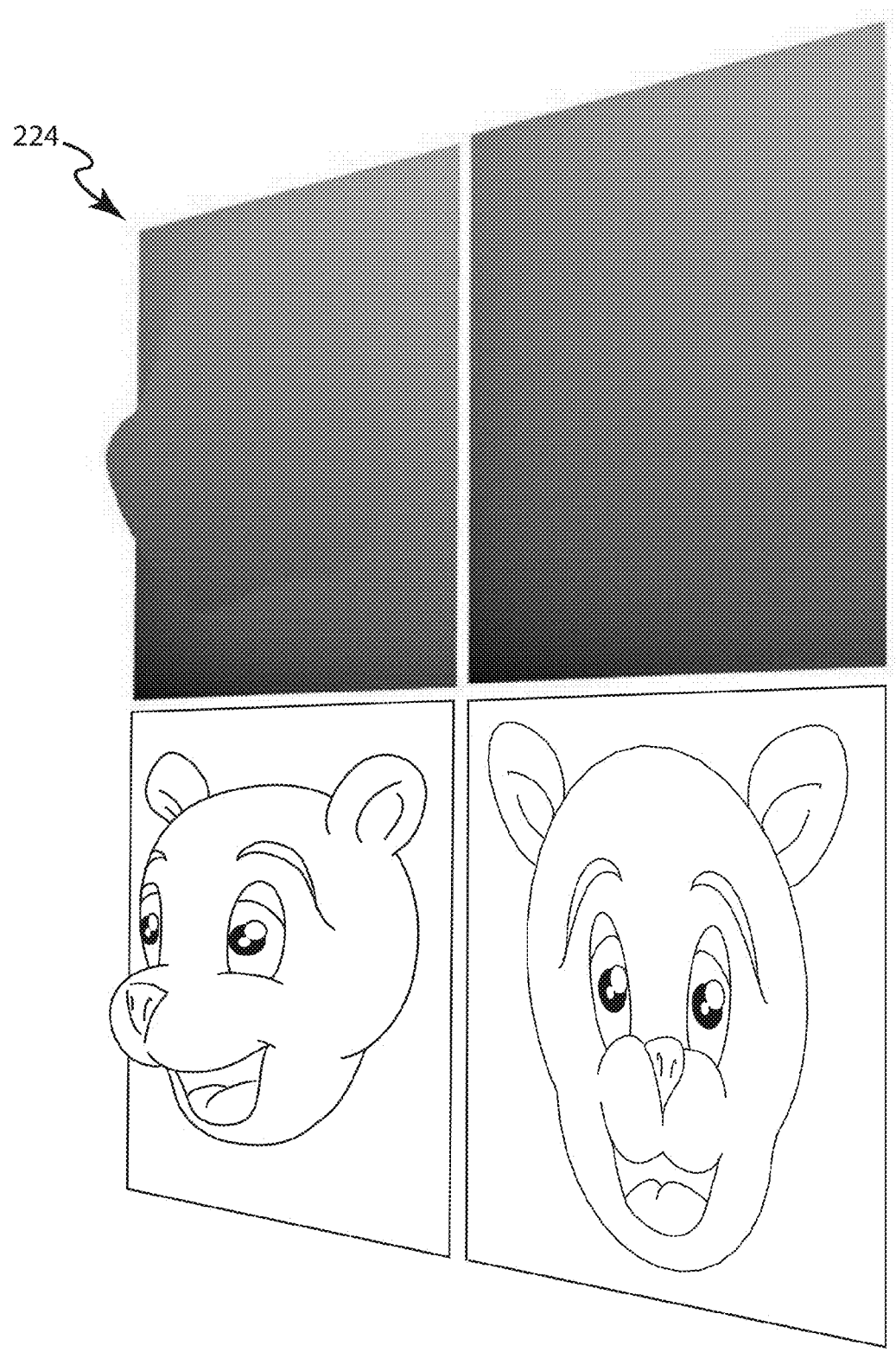
FIG. 7C is a perspective view of a 3D surface with the 2D modified print of FIG. 7B.

FIG. 7C is a perspective view of a 3D surface with deformed or modified print of FIG. 7B. The modified print is created using the pattern of FIG. 7A and the look-up table. A 3D surface 224 is shown in FIG. 7C. The 3D surface 224 is vacuum-formed from a plastic sheet printed with the deformed image 212 shown in FIG. 7B. A reconstructed 3D surface can be generated by using the optical flow maps of FIGS. 7A-7D. The reconstructed 3D surface is very close to the original 3D model used in making the mold for the vacuum forming material, such as that shown in FIG. 7C. The color coding of the displacement maps allows pixels to be uniquely identified between each of the views/images.

The printed vacuum-formed image may be matched to or aligned with an image created from a projector, e.g. video projector. A process may involve creating a 3D shape or geometry that can be traced back to a common original 3D-model with the video projector if calibrated through a photogrammetric scan. A following example provides a combination of original 3D model, a 3D scan of vacuum-formed material, and 3D scans with projector information.

Figure 8:
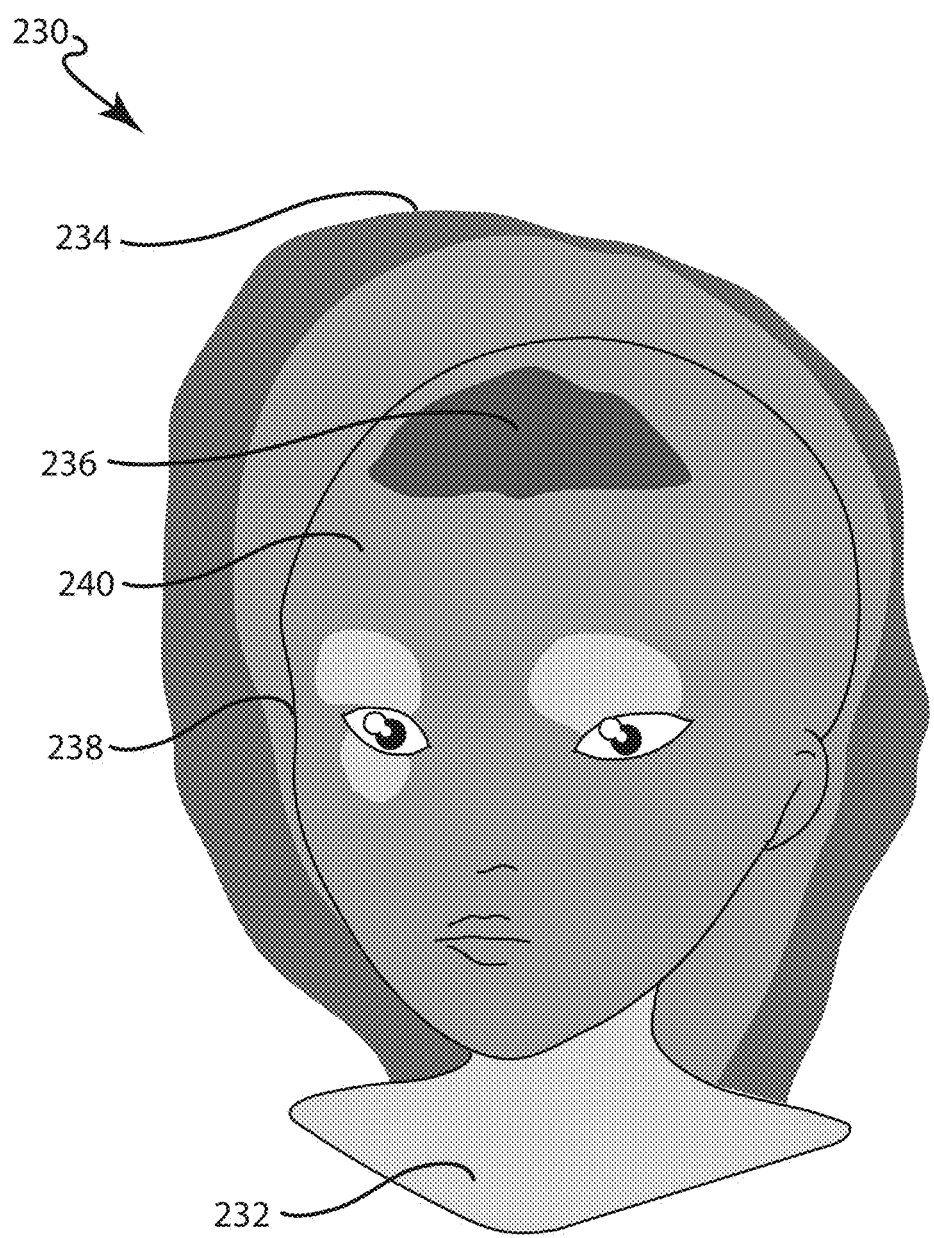
FIG. 8 is a perspective view of a 3D surface including a 3D scan of vacuum-formed material and multiple 3D scans with projector information in accordance with embodiments of the present disclosure.

FIG. 8 is a perspective view of a 3D surface including a 3D scan of vacuum-formed material and 3D scans with projector information in accordance with embodiments of the present disclosure. As shown in FIG. 8, a character 230 includes a neck portion 232 formed from an original 3D model. The character 230 also includes a grey color 3D scan of vacuum-formed material 234 as a head cover. The character 230 may also include several 3D scans with projector information. For example, a first 3D scan with the projector information is a red color 3D scan 236 on an upper portion of a forehead. A second 3D scan with the projector information is a darker red color 3D 240 scan on a portion of the face including a lower portion of the forehead, a lower portion of the nose and the cheek. A third 3D scan with the projector information is a gray color 3D scan 238 on the face including a lower portion of the forehead, an upper portion of the nose and the chin. The 3D scans with projector information may change facial expressions. The 3D scan of vacuum-formed material may be fixed or changed. Both the vacuum-formed material and the projector use the same original 3D model 232.

It will be appreciated by those skilled in the art that more 3D scans of the vacuum-formed materials and more 3D scans with the projector information may be aligned and combined to provide animated movie characters or any moving characters or 3D objects.

The method of the present disclosure can generate a dense mapping that directly corresponds to the number of pixels of the camera. Pixels have a much higher resolution than the grid points resulting in a more accurate and sensitive 2D texture coordinate look-up table than the grid method. The high resolution subtle details, especially for a complicated geometry, to be reproduced more accurately.

In some embodiments, the present method may be completely automated in the correspondence selection operation. In other words, after capturing the pictures of the 2D and 3D objects the processing element may detect the correspondences automatically by evaluating the various images. In contrast, the grid line technique generally requires manual correspondence selection, which can be time consuming and error-prone.

For complicated contours or geometries, the interpolations between grid lines typically lose desired fine details and so the conventional grid line techniques do not accurately detect these changes. For example, very subtle changes that may be present in a shape or complex contours, such as lips for a mouth area, eye regions or nose regions of a human character or an animal character, may not be accurately reproduced by the grid line technique because these subtle changes include fine details or high frequency details between grid lines that are typically lost during the interpolations between intersections of grid lines.

As some non-limiting examples, the present method may provide a texture accuracy of 10 millimeters, or 9 millimeters, or 8 millimeters, or 7 millimeters, or 6 millimeters, or 5 millimeters, or 4 millimeters, or 3 millimeters, or 2 millimeters, or 1 millimeter or better. The texture accuracy may define how close the 2D texture on the vacuum-formed 3D surface is toward the desired texture on the 3D surface. In other words, the accuracy may be defined as the spatial localization difference of the texture between the reconstructed 3D surface and the 3D surface from the original 3D model with the desired texture, i.e., the spatial difference (not color or contrast).

CONCLUSION

In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method for modifying an input image to map to a three dimensional shape prior to forming the three dimensional shape comprising:

receiving by a processor data corresponding to a locally unique non-repeating pattern printed on an input material, wherein the data represents the pattern on the input material prior to the input material being formed into the three dimensional shape;

receiving by the processor at least two post-forming images of the pattern printed on the input material, wherein the post-forming images are captured after the input material has been formed into the three dimensional shape, such that each pixel of the pattern is positioned at a three dimensional location;

analyzing by the processor the locally unique pattern data and the at least two post-forming images to determine a translation table, wherein the translation table directly maps the three dimensional location of each pixel in the pattern on the three dimensional shape to a two dimensional location of each pixel in the pattern as printed on the input material;

reconstructing by the processor a three dimensional shape with color from a two-dimensional print using the translation table; and forming by the processor a modified two dimensional print from the reconstructed three dimensional shape.

2. The method of claim 1, wherein the data corresponding to the locally unique pattern comprises at least two pre-forming images of the input material with the pattern printed thereon prior to the input material being formed into the three dimensional shape.

3. The method of claim 2, further comprises receiving the at least two-preforming images from a camera.

4. The method of claim 2, wherein the pre-forming images and the post-forming images are captured from substantially the same locations.

5. The method of claim 1, further comprising creating a modifying input image by using the translation table to modify the input image to map to the three dimensional shape.

6. The method of claim 1, wherein the input material is substantially planar prior to being formed into the three dimensional shape.

7. The method of claim 1, wherein each pixel in the pattern is uniquely identifiable.

8. A method for modifying a two-dimensional (2D) texture for a vacuum-formed three dimensional surface (3D) comprising:

receiving by a processor an image of a mapping pattern printed on an input material from at least two positions, the mapping pattern comprising a locally unique non-repeating pattern;

receiving by the processor a 2D image of a 3D surface of the input material from the at least two positions, wherein the 3D surface is created by deforming the input material;

determining by the processor a coordinate look-up table of the 3D surface corresponding to each pixel in the digital image of the mapping pattern from each of the at least two fixed positions, wherein the coordinate look-up table directly maps a 2D location of each pixel of the mapping pattern to a 3D location for each pixel of the mapping pattern;

reconstructing by the processor a 3D shape with color from a 2D print from a 2D texture coordinate look-up table; and forming by the processor a modified 2D print from the reconstructed 3D shape.

9. The method of claim 8, wherein the 2D texture coordinate look-up table comprises a displacement map.

10. The method of claim 8, wherein forming a modified print comprises projecting the reconstructed 3D shape to the 2D plane of the 2D input surface, and receiving a 2D image of the 2D plane.

11. The method of claim 8, wherein the non-repeating pattern comprises at least one of random color or random noise.

12. The method of claim 8, wherein the non-repeating pattern allows each pixel within the pattern to be uniquely identified by a local neighborhood of surrounding pixels.

13. The method of claim 8, wherein the non-repeating pattern is a pseudo random pattern.

14. The method of claim 8, wherein the input material comprises a material selected from a group consisting of ABS, polystyrene, acrylic, polycarbonate, PVC, polyethylene, polypropylene, PETG, and a polymer blend.

15. The method of claim 8, wherein the desired texture on the reconstructed 3D shape is accurate to 10 millimeters or less to a desired texture.

16. A system for modifying an input image to print on a material before the material is formed to a three-dimensional shape comprising:

a light source configured to light a surface of the material;

one or more cameras configured to capture an image of a locally unique, non-repeating pattern printed on the material from at least two positions relative to the material;

a computer in communication with the camera comprising a processor configured to perform the following operations:

determining a 2D texture coordinate look-up table of a vacuum-formed 3D surface based, at least in part, on distortions in the locally unique, non-repeating pattern, wherein the 2D texture coordinate look-up table directly translates a 2D location of a select pixel in the pattern to a 3D location of the selected pixel on the 3D surface; and a printer in communication with the computer, wherein the printer prints a distorted 2D texture on a thermoforming material based on the 2D texture coordinate look-up table.

17. The system of claim 16, wherein the 3D surface is vacuum-formed from a planar thermoforming material.

18. The system of claim 17, wherein the planar thermoforming material comprises a 2D texture.

19. The system of claim 16, further comprising a projector to project images onto a projection surface, wherein the projector is in communication with the computer.

20. A method for producing a 3D surface with a distorted 2D texture, the method comprising:

generating a modified 2D texture from an un-deformed 2D input texture according to a 2D texture coordinate look-up table for a vacuum formed 3D surface, wherein the 2D texture coordinate look-up table is formed by analyzing images of a locally unique non-repeating pattern printed on a sample thermoforming material and translates a pixel location for pixels in the pattern between a 2D location on the un-deformed 2D input texture to a 3D location on the formed 3D surface;

printing the distorted 2D texture on a thermoforming material; and vacuum forming the thermoforming material into the 3D surface with a desired texture.

21. The method of claim 20, the step of printing comprising spraying ink on the thermoforming material.

22. The method of claim 20, wherein the desired texture on the 3D surface is accurate to 10 millimeter or less.

23. The method of claim 20, the step of generating a distorted 2D texture comprising:

capturing a digital image of a 2D input surface from at least two fixed positions;

printing a two-dimensional (2D) texture from one of the digital images on a planar thermoforming material, each pixel of the 2D texture comprises a unique element of the locally unique non-repeating pattern;

deforming the thermoforming material to form a three-dimensional (3D) surface;

capturing a 2D image of the 3D surface from at least two fixed positions; and determining a 2D texture coordinate look-up table of the 3D surface corresponding to each pixel in the digital image of the 2D input surface from each of the at least two fixed positions.

24. The method of claim 21, further comprising obtaining a 3D scan of the vacuum-formed 3D surface; and aligning the 3D scan with a 3D scan with projector mapping information.

25. A method for producing a deformed two-dimensional (2D) texture for a vacuum-formed three dimensional surface (3D), the method comprising:

capturing a digital image of a mapping pattern from at least two fixed positions, wherein the mapping pattern is printed on a planar input material, the mapping pattern comprising a locally unique non-repeating pattern;

capturing a 2D image of a 3D surface from the at least two fixed positions, wherein the 3D surface is formed from the input material printed with the mapping pattern;

generating a coordinate look-up table of the 3D surface corresponding to each pixel in the digital image of the mapping pattern from each of the at least two fixed positions, wherein the coordinate look-up table translates a 2D location of the pixels in the mapping pattern to a 3D location of the pixels on the 3D surface;

reconstructing a 3D shape with color from a 2D print at coordinates provided by a 2D texture coordinate look-up table forming a modified 2D print from the reconstructed 3D shape.

26. The method of claim 25, the step of forming a modified print comprising projecting the reconstructed 3D shape to the 2D plane of the 2D input surface, and capturing a 2D image of the 2D plane.

27. The method of claim 25, further comprising: printing the modified print on an input material, the input material is formed into a 3D surface; obtaining a 3D scan of the 3D surface; and aligning one or more 3D scans or images of projection mapped textures with one or more 3D scans or images of the 3D surface.

* * * * *